United States Patent [19]
Krenzel

[11] Patent Number: 5,124,915
[45] Date of Patent: Jun. 23, 1992

[54] COMPUTER-AIDED DATA COLLECTION SYSTEM FOR ASSISTING IN ANALYZING CRITICAL SITUATIONS

[76] Inventor: Arthur Krenzel, 37612 KGAL Dr., Lebanon, Oreg. 97355

[21] Appl. No.: 529,385
[22] Filed: May 29, 1990
[51] Int. Cl.⁵ .......................... G01V 9/00; G01W 1/00
[52] U.S. Cl. ..................................................... 364/420
[58] Field of Search ........................ 364/420, 200, 900

[56] References Cited

U.S. PATENT DOCUMENTS

| | | | |
|---|---|---|---|
| 3,678,388 | 12/1970 | Peterson | 325/4 |
| 3,795,861 | 3/1974 | Lazenby et al. | 324/102 |
| 4,435,981 | 3/1984 | Carson et al. | 73/382 R |
| 4,552,444 | 11/1985 | Beaupre | 354/354 |
| 4,626,063 | 12/1986 | Itorey | 350/619 |
| 4,686,474 | 11/1987 | Olsen et al. | 324/331 |
| 4,814,711 | 3/1989 | Olsen et al. | 324/331 |
| 4,819,053 | 4/1989 | Italauaas | 342/353 |
| 4,833,545 | 5/1989 | Yamada | 358/282 |
| 4,864,127 | 9/1989 | Brane | 250/253 |
| 4,864,127 | 9/1989 | Brane | 250/253 |
| 4,923,233 | 5/1990 | Yamauchi | 364/521 |
| 4,923,253 | 5/1990 | Yamauchi | 364/521 |
| 4,932,753 | 6/1990 | Cohen | 350/130 |
| 4,951,136 | 8/1990 | Prescher | 358/109 |

OTHER PUBLICATIONS

"Optipac" Compression System Priduct Literature; Texas Instruments.
"ANDROX Image Computing Workstation"; ANDROX, Inc. Canton, Mass. Product Literature.
"Video Windows" Frame-Grabbing Product Literature, by New Media Graphics Corp., Billerica, Mass.
"Northstar 9000" Computerized Navigation System Product Literature by Digital Marine Electronic Corp., Acton Mass.
"Photophone" Product Literature by Image Data Corp.; San Antonio, Tex.
"Imagraph" Graphics Controller Product Literature, Imagraph, Inc., Chelsmford, Mass.
"VITEC" Image Computer System Product Literature by Visual Information Technologies Inc., Plano, Tex.
"ERDAS" Geographic Inforamtion System (GIS) by Visual Information Technologies, Inc. Plano, Tex.
"Mapmaker Automaties Using GIS Technology", Computer Graphics World, Oct. 1986.
"AIR 2" Product Literature, Moniteq. Ltd. Ontario, Canada.
"Ortho-Rectification Workstation"Product Literature, International Imaging Systems, Milpitas, Calif.
"MATROX VIP" Image Digitizer Product Literature, Matrox Electronics Systems Ltd., Dorval Quebec.
"Image Ray Tracing:Rendering Real World 3-D Data", Advanced Imaging.
"Model TTM-5T" Navstar GPS Time Transfer Module, Allen Osborne Associates, Westlake Village, Calif.
"Kodak Infrared Imaging System" Product Literature, Eastman Kodak Company, Rochester, N.Y.
"i2S" High Resolution Shutter Camera Product Literature by i2S, Inc. Norwood, Mass.
"Realtime Georeferencing with Stereo Imagery; Rotted Surface and Neural Network Appcoaches" T. L. Logan.
American Society Photogrammetry & Remole Sensing Falls Church, Va.
American Society Photogrammetry & Remote sensing Falls Church Va. Dec. 3, 1988.

*Primary Examiner*—Dale M. Shaw
*Assistant Examiner*—Andrew Bodendorf
*Attorney, Agent, or Firm*—Milton S. Gerstein

[57] ABSTRACT

A system for providing informational data regarding an emergency situation that is accurate and is relatively recent information, which information is referenced to a common database and time-base, so that decision-makers may readily grasp the gravity of the emergency-situation, and react accordingly. The present invention combines the speed and high resolution of electronic imaging with the accuracy of computers to enhance information-flow to emergency-managers. The system of the invention integrates established data-base information, such as those contained in computer-based maps, registered orthophotographs, surveyed information, etc. with high-resolution electronic-imaging to permit a more accurate assessment of current situations. Through the use of the system of the invention, the situation-managers now can view a situation with high resolution, accurate, multi-spectral imaging, in near real-time and display a histogram of change.

7 Claims, 2 Drawing Sheets

COMPUTER-AIDED DATA COLLECTION SYSTEM FOR ASSISTING IN ANALYZING CRITICAL SITUATIONS

BACKGROUND OF THE INVENTION

The present invention is directed to a computer-aided system for providing a high-resolution imaging system with a computerized Geographic Information System to produce rapidly-updated situation-maps for a variety of uses, such as information on critical situations, such as forest fires, and the like, in order to determine the rapidity of change of the critical situation, by which decision-making may be made more responsive and in a much shorter time span. The data transfer between components of the system is designed to be accomplished by conventional telephone and radio communication systems. Data-presentation using computerized graphics provides an enhanced ability to depict current, accurate, reliable pictorial information for better management during rapidly developing situations such as fire, floods, etc.

Traditionally, emergency situations, such as forest fires, earthquakes, environmental spills, etc., use qualitative information from a variety of sources in order to determine the locations, extent and rapidity of change of the damage. Information on the current status of these critical situations and in particular forest fires, have hitherto been derived from "on the scene" personnel, airborne observation, etc., which information is transmitted verbally over telephone and radio, and may be supplemented with optical photography, television, and hand-drawn maps. The emergency-managers, whose task is to deal with and overcome the critical situation, must interpret the current situation from a variety of unrelated information-sources, without having a standard reference database by which the currently-received information may be adjudged. Typically, the received information is subject to a variety of delays, such as, for example, the necessity to develop film of photographs taken of the critical site, the delay associated with aircraft flight-time in returning to the airfield, the failure of complicated microwave down-links, the necessity to hand-carry hard copies, subjective interpretations of the data, etc. Resources are very often misdirected due to delayed, inadequate, exaggerated, or misinterpreted information concerning the emergency in progress.

SUMMARY OF THE INVENTION

The present invention is directed to providing informational data regarding an emergency situation that is accurate and is relatively recent information, which information is referenced to a common data-base and time-base, so that decision-makers may readily grasp the gravity of the emergency-situation, and react accordingly. The present invention combines the speed and high resolution of electronic imaging with the accuracy of computers to enhance information-flow to emergency-managers. The system of the invention integrates established data-base information, such as those contained in computer-based maps, registered orthophotographs, surveyed information, etc. with high-resolution electronic-imaging to permit a more accurate assessment of current situations. The system of the invention utilizes a variety of components of imaging techniques and equipment with computer graphics interconnected by conventional telephone and radio communication.

Through the use of the system of the invention, the situation-managers now can view a situation with high resolution, accurate, multi-spectral imaging, in near real-time and display a histogram of change. The use of data compression, high speed computer graphics, large-file data storage, rapid data retrieval techniques, electronic image correction, and reliable data transmission coupled with a computerized geographic information system results in a new cost effective method of data portrayal, by which decisions may be made based on the most-current data possible.

BRIEF DESCRIPTION OF THE INVENTION

The invention will be more readily understood with reference to the accompanying drawing, wherein:

FIG. 1 is a block diagram showing the components of the system of the invention for gathering data of a critical situation, such as a forest fire; and FIG. 2 is a block diagram showing the components of the system of the invention that receive the gathered data for further processing and analysis.

DETAILED DESCRIPTION OF THE INVENTION

Figure 1:
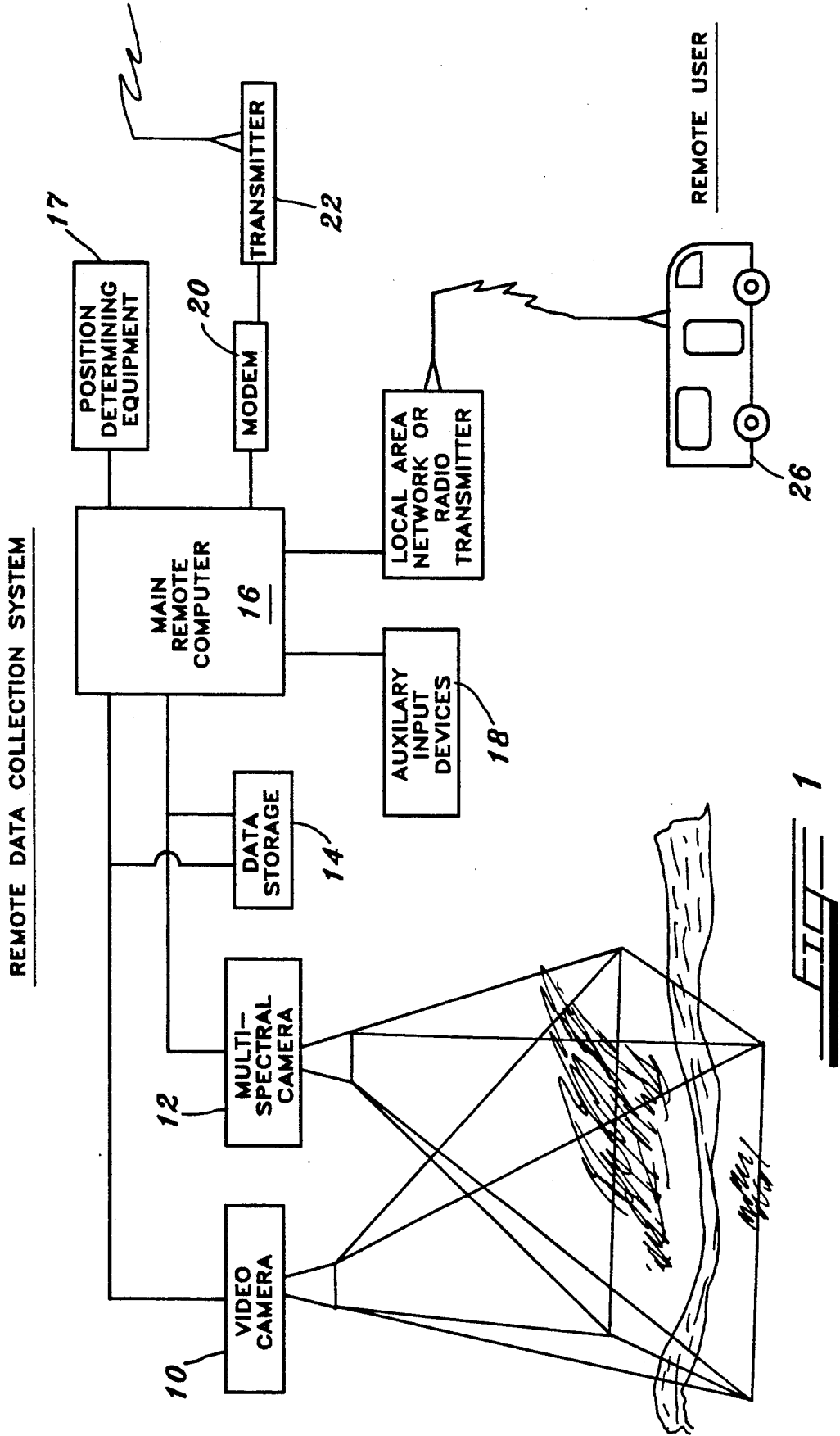

Referring now to the drawings in greater detail, there is shown in FIG. 1 the data-gathering portion of the system of the invention. For exemplary purposes, the system is shown for gathering pertinent information related to a forest fire, although the invention may be used for other crisis-events, as well. The data is collected by aircraft flying over the forest fire, with the forest fire photographed using a video camera 10 or a multi-spectral camera 12. These multi-spectral cameras are conventional, and produce color or black-and-white images using data derived from infrared wavelengths of the electromagnetic spectrum. These cameras are of the scanning single-detector style, such as produced by Minneapolis Honeywell or Inframetrics, or are staring-array cameras, such as produced by Fairchild, Kodak or Sony. The cameras are typically gated or shuttered to reduce the effect of motion or image intensity. The sensing elements are also usually "cooled" cryogenically, by Joule-Thompson expansion or peltier-effect in order to reduce the sensor-background electronic noise. The data thus-collected is represented in digital format and transmitted to the on-board data-collection computer 16 of the aircraft, for storage in RAM 14, or the like. Related information, such as view heading, altitude, camera-attitude, location, situation, North arrow, time-date, voice-overlay, etc., are automatically annotated on each image transmitted, in a conventional manner, by conventional position-determining equipment 17, loran (long-range navigational system), GPS (global positioning systems), clocks, and voice-inertial systems, which constantly input to the computer data representing latitude and longitude, heading, altitude, time, crew, etc. associated with the computer 16, such equipment being conventional. The auxiliary input-devices 18 are also associated with the computer, such as keyboard, and the like. Data storage can also be accomplished using two super VHS recorders or a single multiplexing super VHS video recorder, which records two inputs on a single VHS tape and played back on two separate monitors. These files are then transmitted from the remote on-board computer 16 as digital data using modem 20 and transmitter 22, or the equivalent thereof, such as a facsimile, cellular telephone, packet radio, air phone, or a computerized local area network (LAN) 22. In some cases, the data may be relayed directly to the on-scene personnel 26 to enhance the rapidity of the information flow, so that these on-the-scene personnel may react quickly to rapidly-changing situations, without first having to await commands from a central headquarters. The gathered data, however, is always transmitted to the receiving station, shown in FIG. 2, where the data is analyzed, as described below.

The electronic data files holding the gathered critical information can be transferred to the receiving station, or headquarters, via low cost, readily-available communication-systems, such as land telephone lines or radio transmission in order to achieve near real-time data-transfer. The electronic Local Area Network (LAN), used in the invention, which permits high-speed, graphics-information transfer between computers via ethernet transmission, is manufactured by Agilis Corp. of Mountain View, Calif.

An alternative radio transmission method between the sensor-gathering aircraft and a ground user or radio link is via "packet radio" as produced by Advanced Electronic Applications, Inc. of Lynnwood, Wash. This radio add-on component permits the transfer of digital information from one location to another using conventionally available radio hardware and frequencies. The radio link may be direct line, terrestrial based relay or via satellite.

Alternatively, a "flightfone" can be leased from AT&T, Inc. and the compressed data transmitted from the sensor-computer 16 to the user or headquarters via modem and existing air-to-ground telephonic communication. A high speed modem such as might be used for this application is manufactured by Telebit, Inc. of Mountain View, Calif. Data compression prior to data transfer from the sensor-location and "uncompression" at the work stations can be accomplished using a software package called "Optipac" produced by Optivision, Inc., of Davis, Calif. Data compression is a logical choice due to the large file sizes of the electronic images, especially if the images are in color and 12 bits or more deep. Images-files can be compressed to less than 150th of their original size without significant image quality-loss during transmission. Normally, image compression ratios of 10 to 50 are performed to minimize data transmission-time while retaining the highest quality image available.

The conventional positioning-equipment 17 determine sensor-orientation and can determine view angle by utilizing heading information derived from existing aircraft avionics or a directional gyro such as manufactured by Humphrey, Inc. of San Diego, Calif. The heading-information is utilized by a resident software-program, which continuously generates computer graphics while operating in the computer "background". This software-program automatically produces a "North Arrow" depiction as well as digital heading readout-information continuously overlaid onto the image. This permits rapid orientation by the user of the photograph no matter which way the sensor is viewing or heading when the photo is being taken. In addition, the sensor-location can be derived from satellite data, loran or conventional navigation devices, as described above, and can be displayed at the edge of the frame. The single-frame or slow-scan data can be received by the headquarter's computer and stored, if necessary, in electronic format and can be immediately available for video display. This eliminates the traditional aerial reconnaissance delays due to the necessity of the aircraft to return to the home airport, land, transfer the film to a photo lab, develop and dry the film, etc.

Figure 2:
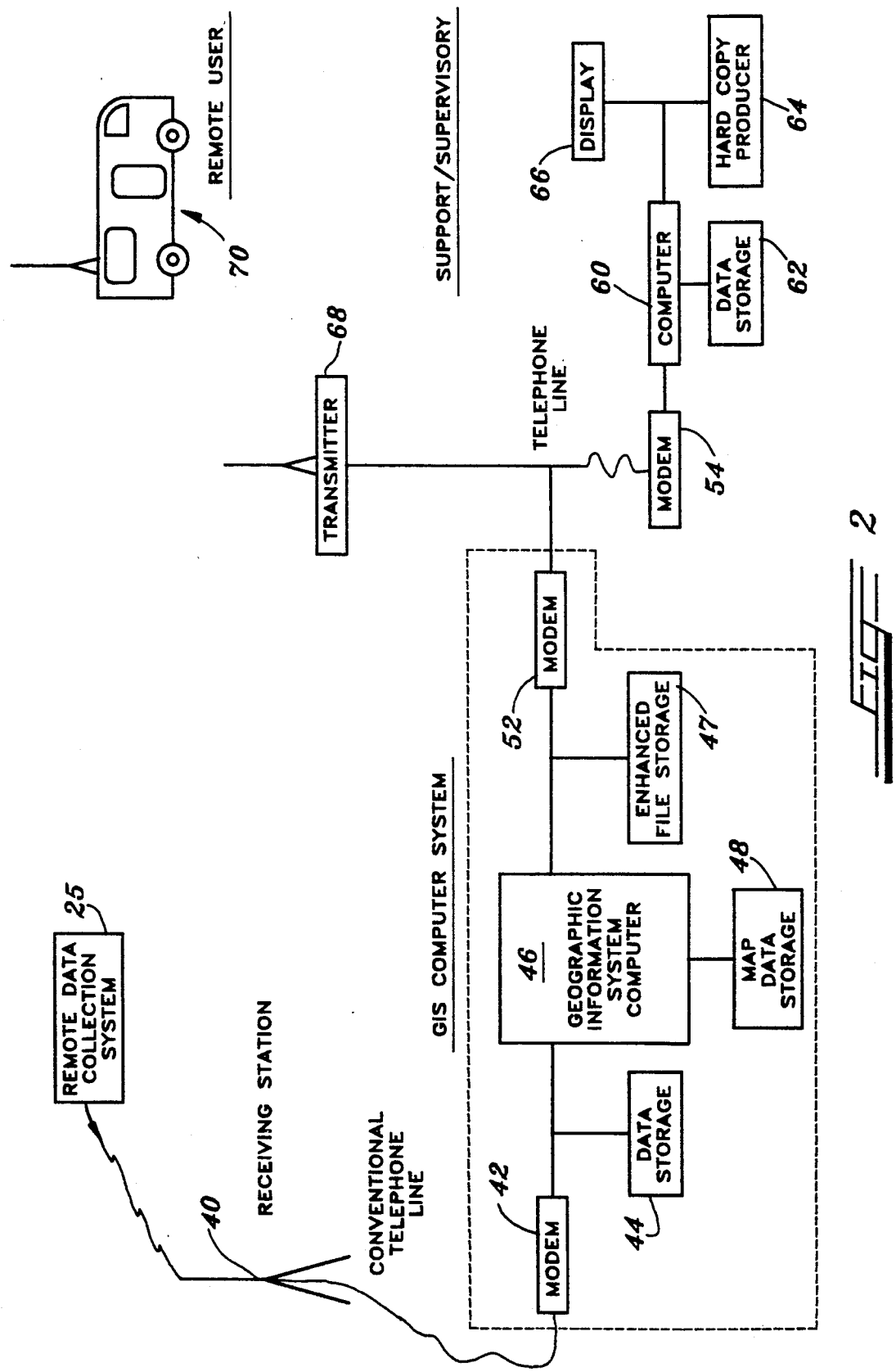

Referring to FIG. 2, the receiving station or headquarters receives the compressed data from the aircraft computer 16 by any of the conventional transmission methods described above. Antenna 40 collects the data from the computer 16, via a modem 42, or the like, and stores the information in RAM or similar storage area 44, for analysis by the main station's computer system 46. The main computer 46 has a conventional geographic information system (GIS), which is an integrated combination of computer hardware and software for the electronic or optical mass-storage of raster or digital-line information, which can be rapidly searched, retrieved, electronically manipulated, updated, etc. and prepared into hardcopy. Basic information-inputs to the system are accepted from scanned photos, digitized maps, digital tapes, electronic file transfer or transfer from other electronic data bases. This GIS hardware and software is produced by VITEC Corp. of Plano, Tex., and by Environmental Systems Research Institute of Redlands, Calif., and also by Intergraph, Inc. of Huntsville, Ala. The function of the GIS system is to provide a digital background or "map" upon which to overlay the electronic image and other gathered data produced and sent by the aircraft sensor-package of FIG. 1. It has the capability of storing several images, comparing them via such techniques as subtraction, and will then compute the area which has changed between photographs, or will produce digital line-graph elevation information, all of which will readily convey to the crisis-managers the needed information as to the change of the critical situation, by which decisions may be reached and action taken.

According to the invention, when more than one information-collecting unit is used, for example, a first sensor operating in the visible-light spectrum, such as a video camera, and a second sensor operating in the infrared spectrum, these two separate images may be converted and combined into one single photograph or image by software and hardware systems made by Androx, Inc. of Canton, Mass. or Matrox, Inc. of Quebec, Canada. These systems permit the continuous generation of a third image which is a composite of the signal from two separate cameras, utilizing imagery of the same area of the forest fire, or the like. This third image may be varied using software-selected thresholds to determine the amount that each picture will be included in the composite. These systems may also allow selected "areas of interest" to be displayed from one camera or the other onto the composite image by using a circle, square or some other shape designated by the operator. The composite image may also be remotely-displayed aboard the data gathering aircraft to enhance positioning ability of the pilot.

The conventional GIS system employed in the invention provides for rapid, accurate registration of the electronic image of the critical site onto an established reference data base, such as a map or digital photograph. Since the electronic image is taken using a camera format, prior to overlay, this image must be converted to map format. Conventional computer software advanced-graphics techniques for accomplishing this is provided for the computer system 46, and are used to provide tilt, bowtie, lens distortion, scale corrections, etc. These corrections are applied such that the overlay of the received image and the map data base can be achieved in common reference format. The base or reference map of the GIS system is stored in memory 48 of the receiving computer 46. The overlaid or updated digital map is stored in memory 50, which updated map contains the necessary information regarding the progress and state of the fire, via the superimposition of the infrared images, or the like, over the reference map, as explained above. As explained above, after conversion to map-format, the corrected, received image is ready for overlay on the standard data-base map, such as the above-mentioned map or ortho-photo retrieved from the Geographic Information System data base 48. Using the location of the center of the image derived from electronic positioning devices 17, such as VOR, TACAN, loran or GPS (global positioning systems), a digital map is rapidly prepared from the electronic database memory. This electronic image or data map by conventional electronic rotation, "zoom" techniques, control point registration, etc. The image is then "warped" to fit a standard, two-dimensional standard base-map or "draped" over an electronically-portrayed three dimensional representation. Once the images are overlaid, they become one data file and can be electronically expanded or contracted to any desired scale as one photo. Since all the data bases are prepared to a constant scale, the previous images can easily and rapidly be compared to the current image. Using currently available software, the images can be electronically compared, and selected changes highlighted, such as in the case of forest fire growth or oil spill. Using this data presentation, the managers possess a valuable histogram of situation-development, and may continue to integrate the standard information-resources into the management plan. Once the image is available in conventional scale-format, it can be overlaid with a variety of other resource information, such as electronically or optically derived personnel, vehicle or aircraft positions, digital-line drawing information, such as roads, hydrology, three species, towns, homes, etc. Any geographic information available within the data base may be specified by the situation-managers to enhance the portrayal of the actual circumstance.

To provide a clear, uncluttered view of the situation, extraneous display information could be eliminated as desired by the incident manager and things pertinent to this emergency could be high lighted in near real-time. Black and white or multi-color images taken at different times could be overlaid on a single two- or three-dimensional data base to demonstrate situation changes with respect to time. Also, a single frame time/image record (histogram) of the ongoing emergency could be animated during or after the crisis to show a variety of subtle interactions which affect the direction, speed and area affected by the emergency.

Retransmission of the combined graphic images from the GIS site 46 to the users is achieved via already-described procedures and equipment, such as modems 52, 54, for transmitting the vital information to the manager's computer 60 for storage in memory 62, where the vital data may be reproduced into a hard copy by laser printers 64, or electrostatic printers, or video printers produced by Seikosha, Inc. of Mahway, N.J. The image may also be reproduced on monitor 66. The critical data-map is also sent to a remote user system 70, typically at the forest-fire site via transmitter 68, so the local personnel can see for themselves the state of the fire, and thus confer with the managers at control headquarters.

The critical data map-images may be viewed in a variety of time-formats, such that managers and trainees could view the animated, developing situation and rapidly grasp the effect of specific actions or determine the situation. This histogram could be extremely valuable in providing a wide range of real-life scenarios from which to train new managers.

While a specific embodiment of the invention has been shown and described, it is to be understood that numerous changes and modifications may be made therein without departing from the scope, spirit and intent of the invention as set forth in the appended claims.

What is claimed is:

1. A system for retrieving informational data representing the current, physical state of a physical, critical situation, such as a forest fire, oil spill, and the like, and for processing the informational data into managerial information for generating current, physical information upon which decisions may be based for taking necessary actions, comprising, in combination:

a mobile data-sensing and retrieving station;

said mobile data-sensing and retrieving station comprising:

first sensor means for gathering informational data at a site of said critical situation at a specific time;

first computer means operatively coupled to said first sensor means for receiving said informational data from said first sensor means and for processing said informational data;

first transmission means operatively coupled to said first computer means for transmitting the processed informational data from said first computer means to a land-based site;

a land-based data-analysis station;

said land-based data-analysis station comprising:

second computer means operatively coupled with said first transmission means for receiving the transmitted informational data from said first transmission means;

said second computer means comprising means for receiving and storing the transmitted informational data from said first transmission means, means for storing prior informational data of the same said site, said stored prior informational data representing the state of said critical-situation site at a point in time prior to said specific time, and means coupled to said means for storing prior informational data for comparing said transmitted informational data to said prior, stored informational data of the same said site;

said means for comparing said transmitted informational data to prior, stored informational data of the same said site comprising means for generating a first reference digital-map representation of said site before said critical situation developed, and for comparing the transmitted informational data to said reference digital-map representation, whereby the status of said critical site may be gauged; said means for comparing said transmitted informational data to prior, stored informational data of the same said site also comprising means for generating a second reference digital-map representation of said site at a previous point in time, and for comparing the transmitted informational data to said second reference digital-map representation, whereby the status of said critical site may be gauged.

2. The system according to claim 1, wherein said first sensor means comprises at least one of a video camera and an infrared-sensing camera operatively coupled to said first computer means; said first sensor means also comprising means operatively coupled to said first computer means for converting said informational-data into binary-coded format for storage in and processing by said first computer means.

3. The system according to claim 2, wherein said first transmission means comprises at least one of a: modem, radio transceiver.

4. The system according to claim 3, wherein said means for receiving the transmitted informational data from said first transmission means comprises at least one of a: modem, and a radio transceiver.

5. A system for retrieving informational data representing the current, physical state of a physical, critical situation, such as a forest fire, oil spill, and the like, and for processing the informational data into managerial information for generating current information upon which decisions may be based for taking necessary actions, comprising, in combination:
a mobile data-sensing and retrieving station;
said mobile data-sensing and retrieving station comprising:
first sensor means for gathering informational data at a site of said critical situation at a specific time;
first computer means operatively coupled to said first sensor means for receiving the informational data from said first sensor means and for processing said informational data;
first transmission means operatively coupled to said first computer means for transmitting the processed informational data from said first computer means to a land-based site;
a land-based data-analysis station;
said land-based data-analysis station comprising:
second computer means operatively coupled with said first transmission means for receiving the transmitted informational data from said first transmission means;
said second computer means comprising means for receiving and storing the transmitted informational data from said first transmission means, means for storing prior informational data of said site, said stored prior informational data representing the physical state of said site at a point in time prior to said specific time, and means coupled to said means for storing prior informational data for comparing said transmitted informational data to said prior, stored informational data of the same said site;
a second sensor-means operatively coupled to said first computer means for gathering informational data at said site representative of the critical situation at the same time that said first sensor means gathers information, said first computer means also receiving the informational data from said second sensor means.

6. The system according to claim 5, wherein said means for comparing comprises means for comparing the transmitted informational data of said first and second sensor means to prior, stored informational data of the same critical-situation site of said means for storing prior informational data of the same critical-situation site, said means for comparing further comprising means for generating a reference digital-map representation of the critical-situation site after the critical situation developed based upon the prior, stored informational data of said means for storing prior informational data of the same critical-situation site, and for comparing said transmitted informational data from both of said first and second sensor means to said reference digital-map representation, whereby the current emergency status of the critical site may be gauged.

7. The system according to claim 5, wherein said means for comparing comprises means for comparing the transmitted informational data of said first and second sensor means to prior, stored informational data of the same said site of said means for storing prior informational data of the same said site, said means for comparing further comprising means for generating a reference digital-map representation of said site before said critical situation developed based upon the prior, stored informational data of said means for storing prior informational data of the same said site, and for comparing said transmitted informational data form both of said first and second sensor means to said reference digital-map representation, whereby the current status of the critical site may be gauged.

* * * * *